United States Patent

Pachynski, Jr.

[11] 4,025,720
[45] May 24, 1977

[54] DIGITAL BIT RATE CONVERTER

[75] Inventor: Alvin L. Pachynski, Jr., Redwood City, Calif.

[73] Assignee: GTE Automatic Electric Laboratories Incorporated, Northlake, Ill.

[22] Filed: May 30, 1975

[21] Appl. No.: 582,325

[52] U.S. Cl. .......................... 178/69.1; 179/15 AF; 179/15 BS; 179/15.55 T
[51] Int. Cl.² .......................................... H04J 3/06
[58] Field of Search .... 179/15 AV, 15 AC, 15 AQ, 179/15 BM, 15 BS, 15 BV, 15 AF, 15.55 T; 178/69.5 R, 53, 53.1 R; 235/152, 154, 155

[56] References Cited
UNITED STATES PATENTS

| | | | |
|---|---|---|---|
| 3,042,751 | 7/1962 | Graham | 179/15 |
| 3,136,861 | 6/1964 | Mayo | 179/15 BS |
| 3,426,153 | 2/1969 | Kitsopoulos | 179/15 BS |
| 3,539,997 | 11/1970 | Mahony | 179/15 BS |
| 3,550,082 | 12/1970 | Tong | 178/69.5 |

Primary Examiner—Benedict V. Safourek
Attorney, Agent, or Firm—Leonard R. Cool; Russell A. Cannon

[57] ABSTRACT

In a digital communication system, apparatus for upconverting the bit rate, $f_1$, of a digital data source to permit digital transmission at a bit rate $f_2$, where $f_2 > f_1$. Pulse stuffing techniques are used to insert a fixed number of time slots in the digital data signal such that the ratio of information time slots to stuffed time slots remains constant. The upconverted signal, consisting of nonredundant data bits and stuffed time slots, is interleaved with framing bits prior to transmission over a digital facility. The framing bits provide the synchronization information to enable the receiver to identify the added time slots and to selectively remove the information data bits from the transmitted line signal. The desired data bits are then restored to their original $f_1$ bit rate.

5 Claims, 4 Drawing Figures

DIGITAL BIT RATE CONVERTER

FIELD OF THE INVENTION

This invention relates to digital communication systems and more particularly to digital bit rate converters for such systems.

BACKGROUND OF THE INVENTION

Basically, a digital bit rate converter converts the bit rate of an applied digital signal by either increasing or decreasing the time period allocated to each bit. Such converters are commonly used in digital transmission systems as interface devices. A digital repeatered transmission facility normally has only a narrow band of frequencies over which it operates satisfactorily, and frequently the bit rates of data sources are outside the operable frequency range of such transmission facilities. When a data source cannot be modified to operate at the facility rate, a bit rate converter of the type discussed herein must be used, to interface the data source with the transmission line.

Unfortunately, the prior-art converter systems are relatively complex arrangements. Furthermore, they do not always make full use of the communication channel provided. In an arrangement disclosed in U.S. Pat. No. 3,548,309, issued to B. R. Saltzberg, et al, on Dec. 15, 1970, the message bit stream is simply sampled at the line rate, and the redundant samples are transmitted along with the nonredundant samples. A complex receiver then blocks the redundant samples to recover the original signal. Such a system is wasteful of the information-carrying capacity of the transmission channel since redundant samples are transmitted with the information signal.

One objective of this invention is to provide a system for increasing the bit rate of a digital bit stream to a higher bit rate to permit transmission over a digital communication facility.

It is another object of this invention to provide a digital receiver capable of separating the original data bit stream from the transmitted composite line signal.

SUMMARY OF THE INVENTION

In accordance with this invention, the repetition rate $f_1$ of a digital data signal is raised to a higher repetition rate, $f_2$, for transmission over a digital communication facility. In accordance with one embodiment of this invention, the digital data signal to be transmitted is first applied to a sampling circuit in which the basic upconversion process is performed. The sampling circuit operates under the direct control of a timing circuit which establishes the sampling rate. Initially, the sampling is performed at the $f_2$ transmission line rate which, by definition, is higher than the information bit rate $f_1$ of the data signal. This sampling transforms each information bit from a period of $1/f_1$ to a period of $1/f_2$. If the data signal were continuously sampled at the $f_2$ rate, $f_2 - f_1$ redundant samples would be created per second in the upconverted signal. However, before any bit is sampled twice, the sampling circuit is momentarily stopped for a predetermined period of time ($1/f_2$) and then restarted before any data bit is lost, i.e., not sampled. By interrupting the sampling circuit for periods of $1/f_2$ at a $1/(f_2 - f_1)$ rate, the timing circuit assures that each and every bit of the applied data signal is sampled once and only once. The overall effect is that the applied data signal is upconverted to the desired line rate, $f_2$. Interrupting the sampling circuit in this manner creates gaps, also called blanking intervals, in the sampled output signal. These gaps, or empty time slots, may be used to stuff added information into the composite line signal. Once these stuffed information bits are added during the blanking interval, the composite line signal is transmitted over an appropriate digital facility.

This upconversion process is a form of digital time-division multiplexing and requires that the transmitter and receiver maintain some form of synchronization so that the stuffed bits can be identified and removed from the composite line signal. Synchronization is maintained by inserting some of the stuffed bits at the transmitter in a particular sequence, which is recognizable by the receiver. A reframing circuit synchronizes the receiver to these stuffed framing bits and identifies the blanking interval in the received line signal. From this information, the receiver is able to recover the information bits by several different methods. In the preferred embodiment, the sampling clock signal $f_1'$ used at the transmitter is regenerated at the receiver, and is used to clock a sampling device which selects out only the desired information bits. From the clock signal $f_1'$, the original $f_1$ timing can be recovered and used to retime the selected information bits, reestablishing the original digital data signal.

DESCRIPTION OF THE DRAWINGS

The above and other features of this invention will be considered in the following specification in connection with the accompanying drawings in which.

DETAILED DESCRIPTION

Figure 1:
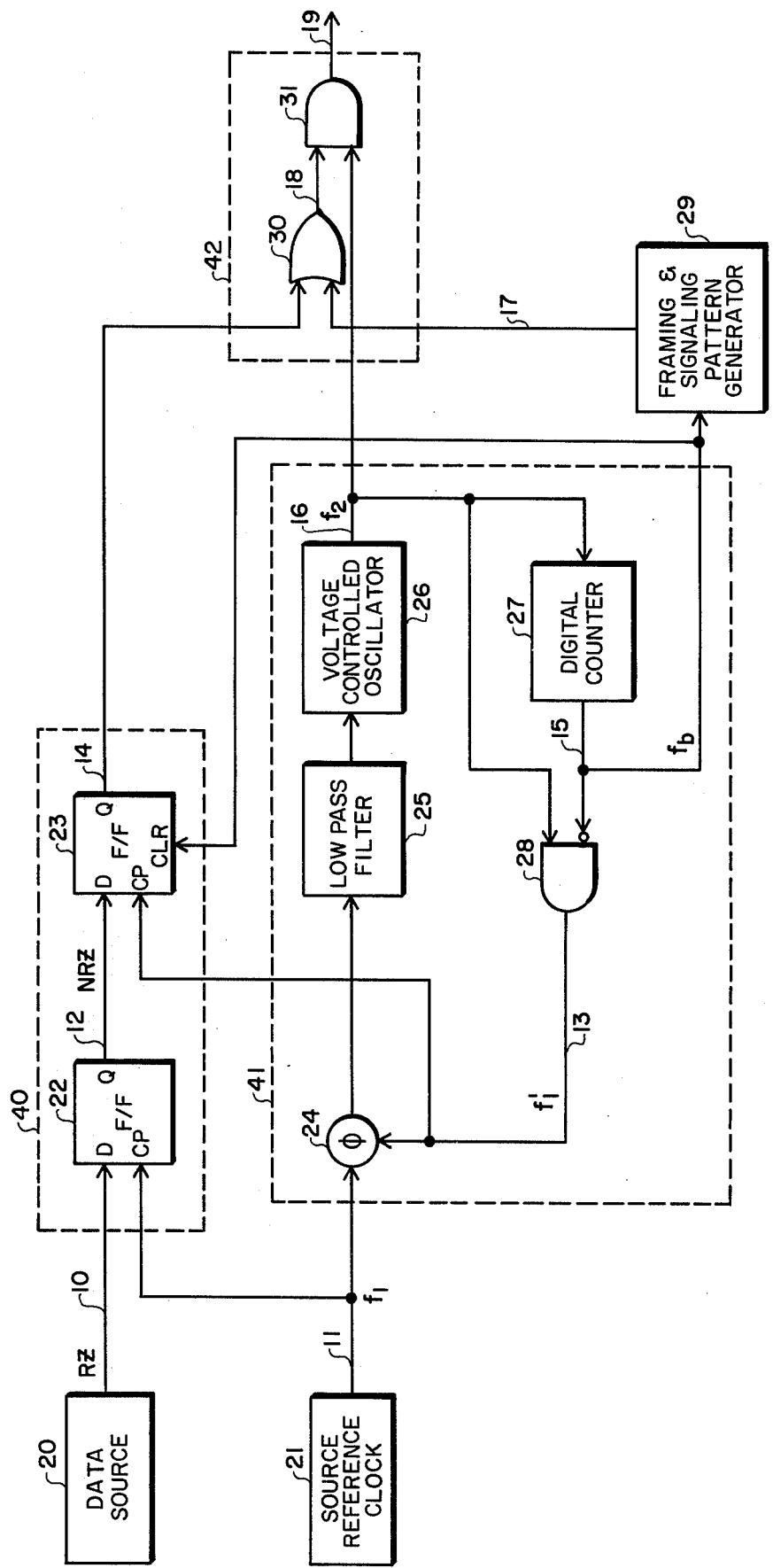
FIG. 1 is a block diagram of one embodiment of a transmitter in a digital communication system according to this invention.
Figure 2:
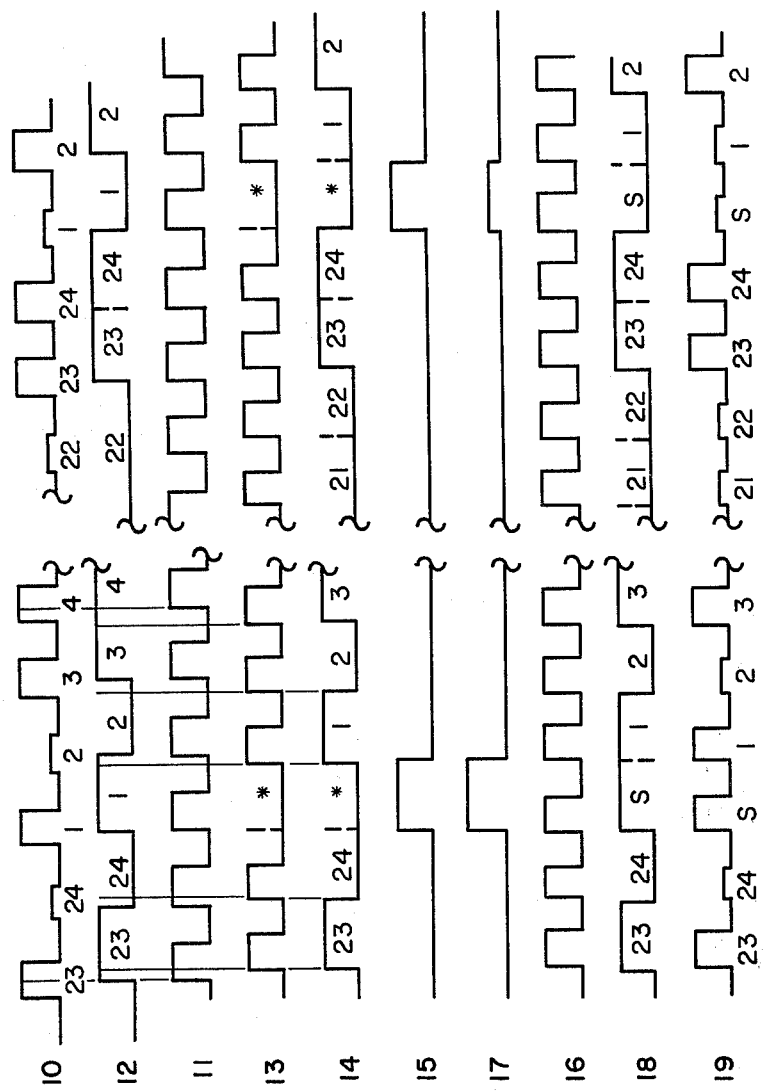
FIG. 2 illustrates the idealized waveforms occurring in the referenced parts of the embodiment shown in FIG. 1.

The specific embodiment shown in FIG. 1 which is illustrative of the principles of this invention comprises the transmitter portion of a digital communications facility. The associated waveforms for this particular transmitter are shown in FIG. 2, with a coordinating receiver shown in FIG. 3. The digital transmission link connecting such a transmitter and receiver together may comprise a wire line, a cable, a microwave radio facility, or a telephone communication channel. The proper choice of a particular transmission link would depend upon several factors including frequency requirements. The digital data source 20, shown in FIG. 1, is usually furnished by the user of the transmission system, and such a source could comprise, for example, the transmit portion of a pulse-code modulation terminal. The source reference clock 21, providing the basic timing for the source signal, $f_1$, on path 10 is also usually furnished by the user of such a transmission system; however, this is not a requirement for proper system operation. The clock signal provided by source 21 could just as easily be derived by the transmitter from the digital data signal on path 10. Clock recovery circuits capable of reproducing the $f_1$ source timing are well known in the art.

It is assumed, for purposes of illustration, that data source 20 produces an RZ (return-to-zero) digital bit stream on path 10, as shown by the waveform on line 10 in FIG. 2. Although many digital sources are capable of providing NRZ (nonreturn-to-zero) digital bit streams, the RZ condition has been assumed here since this is a more general condition. If an NRZ signal is provided, the design of transmit sampler 40 is somewhat simplified.

The transmitter shown in FIG. 1 can be divided into four basic parts corresponding to their functional operation: a transmit sampler 40, a gated phase-locked loop (GPLL) 41, an interleaving circuit 42, and a framing and signaling pattern generator 29. Transmit sampler 40 in FIG. 1 performs two distinct functions. It converts the input RZ digital signal to an NRZ signal, and it "upconverts" the basic signal repetition rate from rate $f_1$ to rate $f_2$. (It should be noted that "upconversion" is used herein to denote a digital process and is unrelated to an analog heterodyne frequency shift). The digital upconversion process operates under the direct control of GPLL 41 via the sampling clock signal $f_1'$ on path 13. The GPLL 41 is a timing circuit that generates two clock signals: the sampling clock signal $f_1'$ and a blanking clock signal $f_b$. This latter clock signal is used within clock circuit 41 internally, and it is used by the framing and signaling pattern generator 29 as a timing reference for the framing signal generated on path 17. Transmit sampler 40 also uses the $f_b$ clock signal to insert gaps in the upconverted signal. The digital signal on path 17 and the sampled upconverted signal of bit rate $f_2$ are combined by the interleaving circuit 42. These combined signals form the composite line signal on path 19, which are then transmitted over a digital line to the receiver.

Examining now the transmitter in FIG. 1 in more detail, transmit sampler 40 comprises two D-type flip-flops 22 and 23. Such flip-flops are also called "T-type" flip-flops and are positive-going, edge-triggered devices. This means the devices operate so that a positive-going pulse applied to the CP (clock) input causes the D-input signal to be sampled at the instant the positive pulse is applied. And, the Q output holds that sampled signal level until the next sampling instant. The CLR (clear) input to a D-type flip-flop forces the Q output to a zero level upon the application of a positive pulse to the CLR input. The bit stream on path 10 from data source 20 is applied to flip-flop 22 at the D-input. The CP-input of flip-flop 22 is connected to the source clock signal $f_1$ on path 11 supplied by source reference clock generator 21. Lines 10 and 11 in FIG. 2 illustrate the waveforms of the RZ input signal and the $f_1$ clock signal, respectively. Referring to lines 10, 11, and 12 in FIG. 2, it is clear that flip-flop 22 alters the RZ signal (line 10) to an NRZ signal (line 12). The leading edge of each bit on line 11 causes each bit on line 10 to be sampled and held throughout a period of $1/f_1$. An arbitrary phase shift has been chosen in FIG. 2 for lines 10 and 12 to denote the time lag between the input and output of flip-flop 22. (If data source 20 were capable of providing an NRZ signal, flip-flop 22 would not be required.) The NRZ output signal on path 12 is applied to the D-input of flip-flop 23. The clock signal applied to the CP-input of flip-flop 23 is $f_1'$ on path 13. Its waveform is shown in FIG. 2, line 13.

The sampling clock signal $f_1'$, which controls the sampling rate of flip-flops 23, is generated by the GPLL 41. A portion of GPLL 41 comprises the standard components found in a phase-locked loop: phase comparator 24, lowpass filter 25, and voltage-controlled oscillator (VCO) 26. If the output path 16 were connected directly to feedback connection 13 of phase comparator 24, the circuit would be in a conventional phase-locked loop configuration. The modified feedback loop, however, consists of a digital counter 26 and AND-gate 28. This modification to the feedback loop maintains the proper timing relationship between the sampling clock signal $f_1'$ and the composite line clock signal $f_2$.

The $f_2$ clock signal generated by VCO 26 on path 16 is applied to the digital counter 27 and AND-gate 28. After a predetermined number of $f_2$ clock pulses, counter 27 generates the binary signal $f_b$ on path 15, shown in FIG. 2 by line 15. The exact number of clock pulses counted each time may be either a fixed number or a predetermined sequence of numbers. The only restriction on the pulse count is that the proper timing relationships between $f_1$ and $f_1'$ be maintained. In the particular example shown by the waveforms of FIG. 2, $f_b$ is generated with a duration $1/f_2$ and occurs after a count of 24 $f_2$ bits. (The 25th $f_2$ bit occurring during the $f_b$ pulse is not counted). The $f_b$ clock signal is referred to as a blanking signal since it has the effect, through the application of AND-gate 28, of creating a blanking interval in the $f_1'$ clock signal. The presence of a positive signal on path 15 causes AND-gate 28 to be inhibited for the duration of the applied signal. Since $f_b$ has a width of $1/f_2$, one complete bit is blanked from an otherwise continuous $f_2$ signal at the output of AND-gate 28 on path 13. This interrupted signal on path 13 represents the sampling clock signal $f_1'$ which is applied on path 13 to one input of phase comparator 24. Applied to the other input of comparator 24 is the source clock signal $f$ on path 11. Phase comparator 24 compares these two signals and generates a continuous output signal which represents the difference in phase between $f_1$ and $f_1'$. This difference signal is averaged in lowpass filter 25 and then applied to VCO 26 as a correction signal. The end result of this phase-locked loop comparision is that the average bit rate of $f_1'$ is made equal to the continuous bit rate of $f_1$. The $f_1'$ sampling clock signal is applied to transmit sampler 40 at the CP input to flip-flop 23. The $f_1'$ clock signal causes flip-flop 23 to sample at a rate $f_2$ and to sample each and every applied bit only once. It is the presence of the blanking interval in the $f_1'$ clock signal which slows its average bit rate to that of the applied signal, i.e., $f_1$. To introduce this blanking interval in the sampled bit stream, the clear input (CLR) is required. The sampled output appears on path 14 and is shown by the waveform on line 14 in FIG. 2. The blanking interval in this output signal is shown in FIG. 2, line 14, by the interval marked with an *. This upconverted signal represents a signal having a bit rate of $f_2$ with an information content of only $f_1$. Before this signal can be transmitted to the receiver, framing bits (also called synchronizing bits) having a known sequence must be inserted into the signal or otherwise transmitted to the receiver so that the receiver may synchronize its operation to that of the transmitter. Without framing bits, the receiver has no way of determining a stuffed bit from a message bit.

The framing and signaling pattern generator 29 generates the framing bits which are inserted during the blanking interval at OR-gate 30. The framing bits shown in FIG. 2 by line 17 constitute a simple one-zero pattern. The $f_b$ blanking signal is used by the framing and signaling pattern generator 29 to properly time the framing bits so that they may be inserted during the blanking interval simply by an OR-gate. There are any number of framing and signaling pattern generators capable of generating a framing pattern given the timing signal $f_b$. The complexity of this generator depends upon the framing pattern desired. For the simple one-zero sequence shown in FIG. 2, generator 29 could be implemented with a simple divide-by-two counter coupled with an AND-gate connected in series. Any other framing pattern would require a more complex circuit arrangement. A more complex framing generator may be desirable in general to permit utilization of the full information-carrying capacity of the transmission line. A low-speed digital data signal could then be stuffed in the composite line signal on a time-division multiplex basis during the blanking interval with the framing bits. Such data bits, for example, could be simply alternated with the framing bits during the blanking interval. The limiting factor on the number of stuffed bits that can be added to the composite line signal clearly depends upon the $f_2 - f_1$ difference in frequency.

The interleaved NRZ digital signal appearing on path 18 is applied to AND-gate 31 before transmission. The interleaved output is shown in FIG. 2 by line 18, and the stuffed bits are indicated by the letter S. AND-gate 31 uses the $f_2$ clock signal to convert the NRZ signal on path 18 to the RZ composite line signal on path 19, as shown in FIG. 2 by line 19. The output signal is then applied to an appropriate digital transmission facility.

A modification to the $f_2$ clock signal applied to AND-gate 31 may be desirable in high-speed data systems to prevent a race condition. OR-gate 30 introduces a very small delay into the upconverted signal on path 14 and therefore it may be necessary to delay the $f_2$ clock input to AND-gate 31. This could easily be implemented with an inverter circuit in path 16 producing a 180° phase shift to the $f_2$ timing signal.

The apparatus shown in FIG. 1 whose operation has been described in detail above increases the effective bit rate of an applied digital bit stream to facilitate transmission of the signal over a digital path. As described, this is accomplished by periodically stuffing an added time slot in the sampled bit stream. In the particular example chosen in FIG. 2, an added time slot is inserted after every 24 information time slots. The stuffing ratio $S_R$, which is defined as $$S_R = f_1/(f_2 - f_1) = \frac{\text{Number of information time slots}}{\text{Number of stuffed time slots}},$$

is equal to 24 for the example in FIG. 2. To further illustrate this in a system in which $f_1 = 4800$ b/s and $f_2 = 5000$ b/s, the stuffing ratio, $S_R$, would be equal to 24. Or, one added time slot is stuffed every 24 information time slots.

The gated phase-locked loop 41, shown in FIG. 1, guarantees that this ratio $S_R$ shall remain fixed independent of changes in the $f_1$ bit rate. This feature coupled with a fixed frame format greatly simplifies the design of a compatible receiver as will be seen with relation to FIG. 3. An implication of such a system is that $S_R$ be a rational fraction, otherwise digital counter 26 in FIG. 1 may not be physically realizable. In the real world, this is not a severe limitation since $f_1$ and $f_2$ represent real frequencies, and as such they will always be divisible into each other. Since they can be related to each other by some ratio, digital counter 27 can be physically implemented. To illustrate this somewhat, consider a frequency relationship between $f_1$ and $f_2$ which required a stuffing ratio $S_R$ of 48.25. Since this is not a whole number, a more complex format must be used to produce the desired stuffing ratio. A ratio of 48.25 requires that one added time slot be inserted for every 48.25 information time slots or, stated somewhat differently, four added time slots must be added for every 193 information time slots. A particular frame format capable of implementing such a stuffing ratio would be as follows: 49, S, 48, S, 48, S, 48, S, 49, S, 48, S, 48, S, 48, S ..... After the first 49 information bits, an added bit is stuffed followed by a sequence of 48 more information bits, and so on, in the indicated sequence. Such a format could constitute one or more frames of the composite line signal on path 19. To implement such a format, digital counter 27 would be somewhat more complex since such a counting pattern, as indicated, would have to be programmed into the counter circuitry.

Figure 3:
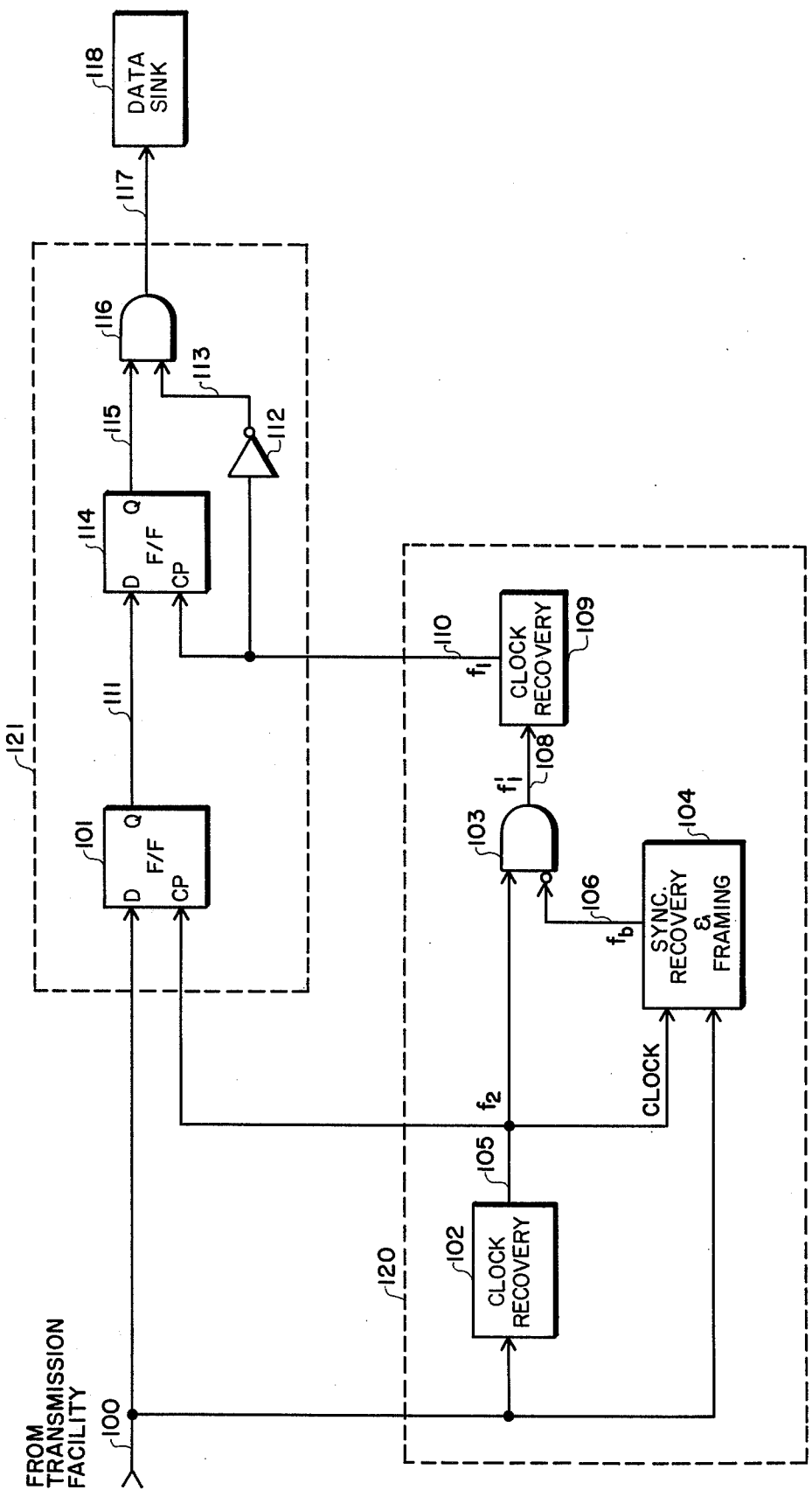
FIG. 3 is block diagram of the recevier in a digital communication system according to this invention.

FIG. 3 illustrates the receiver equipment which is a part of the digital communication system. The receiver is shown connected to the same digital transmission facility used by the transmitter equipment of FIG. 1. Applied to the receiver at this input connection is the transmitted composite line signal. Basically, the receiver demultiplexes the line signal and then down-converts the demultiplexed data bits. A clock circuit in the receiver locks onto the framing bits which establishes a time base from which the receive clock signals are generated. Once synchronized with the framing bits, the receiver selectively removes each upconverted data bit from the composite line signal and then retimes each bit to reestablish the proper $f_1$ timing.

Functionally, the receiver consists of two basic sections: the receive timing circuitry 120 and the receive demultiplexer 121. Circuit 121 is referred to as a demultiplexer since its function is to selectively remove the upconverted data bits from the composite line signal. The demultiplexer circuit 121 also retimes the selected upconverted data bits to the original bit rate $f_1$ and then delivers them to a data sink. The receive timing circuit 120 consists of clock recovery circuits, sync recovery circuits, and associated logic circuits. The receive timing circuit 120 generates the received timing signals which are synchronized to the framing bits. The demultiplexer circuit 121 requires these timing signals to enable it to selectively remove the upconverted data bits.

More specifically, the receive timing circuit 120 comprises clock recovery circuits 102 and 109, sync recovery circuit 104, and logic gate 103. Circuit 102 is a standard clock recovery circuit which recovers the natural clock frequency of the composite line signal. The $f_2$ clock signal is applied on path 105 to gate 103, sync recovery circuit 104, and flip-flop 101. The sync recovery circuit 104 uses this $f_2$ clock signal in conjunction with the composite line signal to regenerate the blanking signal $f_b$. This is the same $f_b$ signal generated at the transmitter shown in FIG. 1. Sync recovery circuits (also called frame detectors) capable of regenerating this signal from the clock signal $f_2$ and the input line signal 100 are well known in the art. The sync recovery circuit 104 could also be used to demultiplex any low-speed digital information multiplexed during the blanked interval at the transmitter.

Figure 4:
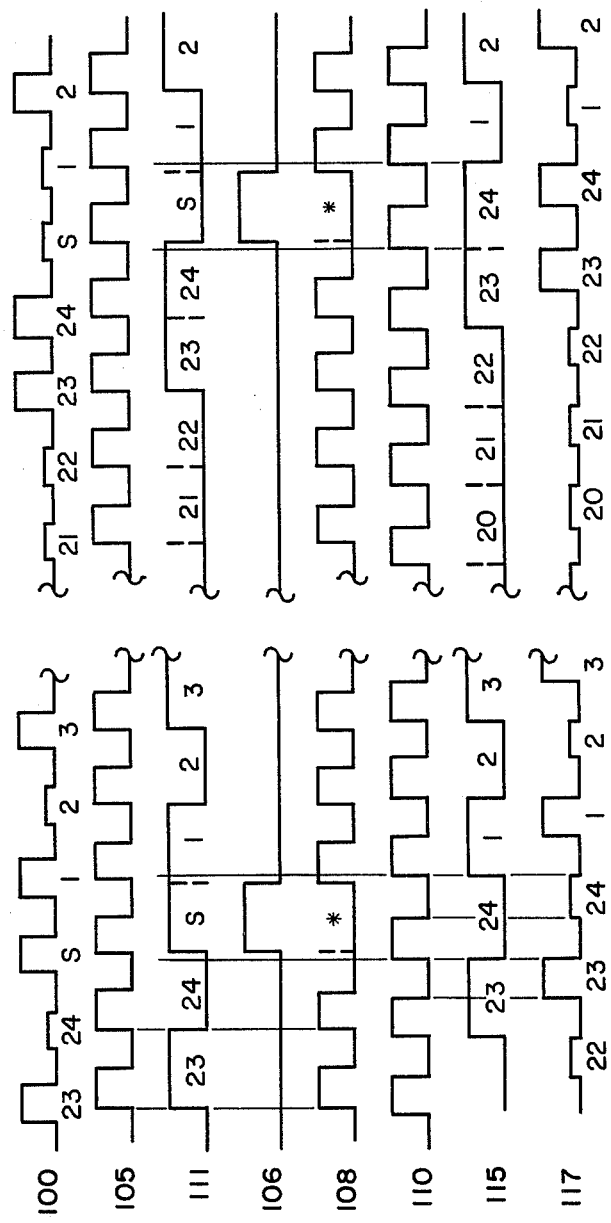
FIG. 4 illustrates the idealized waveforms occurring in the referenced parts of the embodiment shown in FIG. 3.

Blanking signal $f_b$ is applied via path 106 to the inverting input of AND-gate 103. AND-gate 103 performs the same function as AND-gate 28 in FIG. 1, that is it generates the clock signal $f_1'$. The output of AND-gate 103 on path 108 represents a signal whose average repetition rate is equal to $f_2 - f_b$. On an instantaneous basis, every 25$^{th}$ pulse applied to clock recovery circuit 109 is prevented by the blanking signal $f_b$ (assuming the frame format and frequency relationships are as shown in FIGS. 2 and 4). Comparing the two $f_1'$ waveforms in FIG. 2 and FIG. 4 (lines 13 and 108) it is clear that both signal patterns are identical. Once this $f_1'$ clock signal is generated, the original $f_1$ clock timing can be recovered with a standard clock recovery circuit 109. The output signal from clock recovery circuit 109 is applied via path 110 to the receive demultiplexer 121. The clock signal controls the sampling rate and timing of flip-flop 114 and is shown in FIG. 4, line 110.

The receiver demultiplexer 121 comprises two D-type flip-flops 101 and 114, AND-gate 116, and inverter circuit 112. Actually, inverter 112 may not be required in all applications, as will be discussed below. Flip-flop 101, using the $f_2$ timing signal as a clock input, performs a conversion of the RZ input signal to an NRZ signal. This NRZ waveform is shown in FIG. 4 by line 111. The second flip-flop 114 uses the $f_1$ clock timing signal on path 110 from timing circuit 120 to selectively remove the transmitted upconverted information bits from the composite line signal. Since flip-flop 114 is an edge-triggered device, the input signal (waveform 111) is sampled at the instant each positive-going pulse is applied to the CP input. By comparing the two waveforms as shown by lines 111 and 110 in FIG. 4, it is apparent that the output signal on path 115 is as shown by waveform 115 is FIG. 4. This resulting waveform consists of the original information data bits having exactly the same timing as that of the transmitted signal, i.e., $f_1$. The $f_1$ clock timing on path 110 with respect to the input signal on path 111 is very important, as is obvious by reference to the waveforms in FIG. 4. Notice that the phasing of the $f_1$ clock signal must be such that the blanking interval of the composite line signal (indicated by S in line 111 of FIG. 4) is not sampled. In the event that the output signal of clock recovery circuit 109 does not have the proper phase in relation to the NRZ signal on path 111, a phase control circuit, a delay line, or similar device must be used in path 110 for adjustment of the phase as shown in FIG. 4.

To convert the NRZ down-converted signal on path 115 to an RZ signal, AND-gate 116 and inverter circuit 112 are used. Inverter circuit 112 merely shifts the phase of the clock signal on path 110 by 180° with respect to the output clock signal on path 113. The purpose of this device is merely to avoid the possibility of a race condition between the signals on path 115 and 110. This consideration is particularly a problem in high-speed data systems. Hence, the use of this device, like the inverter circuit referred to in reference to FIG. 1, is optional and its use depends upon factors well known in the art. The output signal appears on path 117 and is applied to a data sink 118. This waveform is as shown by line 117 in FIG. 4.

This invention has been described only with respect to certain specific embodiments. It is to be understood that various modifications can be devised by those skilled in the art without departing from the spirit and scope of the invention. By way of example and not limitation, the D-type flip-flops shown in FIGS. 1 and 3 could be replaced with other devices which performed the equivalent function. In FIG. 3, another modification could be made to the clock circuitry 120. AND-gate 103 and clock recovery circuit 109 could be eliminated and the $f_b$ blanking signal could be used to block transmission of the framing bits during the blanking interval through the use of an appropriate sampling device. The output of such device would then constitute the data bits; however, they would not be restored to their original $f_1$ time base. The time base would be equivalent to the $f_1'$ clock signal. Also, the use of inverter circuit 112 in FIG. 3, as has been stated, is optional and its use depends upon other factors not considered herein. Certainly, other modifications could be made without departing from the spirit and scope of this invention.

What is claimed is:

1. In a digital data transmission system having a transmitter and a receiver, apparatus at said transmitter for increasing the bit rate $f_1$ of a digital data signal and forming a composite line signal of bit rate $f_2$ having a predetermined framing pattern, said apparatus comprising:

means for providing a first clock signal of bit rate $f_1$;

timing means responsive to said first clock signal, said timing means providing a second clock signal of bit rate $f$ wherein, $f_2$ is related to $f_1$ such that $f_1/(f_2-f_1)$ is a rational, fixed number, said timing means comprising:

a phase-locked loop having a phase comparator, a low pass filter, a digital voltage-controlled oscillator, and a feedback circuit of said phase-locked loop further comprising:

means for sequentially counting predetermined numbers of bits from said oscillator and generating a third binary clock signal having a bit rate of $(f_2-f_1)$ and a pulse width of $1/f_2$; and logic means interrupting said second binary clock signal in response to said third binary clock signal;

means for upconverting said digital data signal to an upconverted bit stream comprised of nonredundant sampled data bits of said $f_2$ bit rate, and having periodic signal gaps which have a duration of $1/f_2$ and which occur at a rate of $f_2-f_1$, said upconverter comprising:

means responsive to said first and second clock signals for generating a fourth binary clock signal $f_1'$ having an average bit rate $f_1$ and associated periodic gaps therein of duration $1/f_2$ occurring at an average rate of $(f_2-f_1)$ with an average bit rate between said gaps of $f_2$; and means sampling digital data signal in response to said fourth clock signal;

means for generating stuffed bits, said bits including framing bits having a predetermined pulse sequence; and means for interleaving said upconverted bit stream with said stuffed bits forming said composite line signal.

2. Apparatus in accordance with claim 1 further comprising:

a digital transmission line capable of operating at a bit rate $f_2$; and receiver means for recovering said digital data signal of bit rate $f$ from said composite line signal in response to said framing bits.

3. Apparatus in accordance with claim 2 wherein said receiver means further comprises first clock recovery means responsive to said composite line signal and generating a receive clock signal having the same waveform as said first clock signal at said transmitter; and means for separating said applied digital data signal from said composite line signal in response to said receive clock signal.

4. Apparatus in accordance with claim 3 wherein said separating means further comprises:
a flip-flop clocked by said receive clock signal.

5. Apparatus in accordance with claim 4 wherein said receive clock recovery means further comprises:
a second clock recovery means responsive to said composite line signal regenerating said second binary clock signal;
a third clock recovery means responsive to both said second binary clock signal and said composite line signal regenerating said fourth binary clock signal;
logic means gating said second binary clock signal off in response to said fourth clock signal regenerating said third binary clock signal; and
a fourth clock recovery means responsive to said third binary clock signal generating said receive clock signal.

* * * * *